(12) United States Patent
Paul

(10) Patent No.: US 8,032,600 B2
(45) Date of Patent: Oct. 4, 2011

(54) TREATMENT OF EMAIL MESSAGES SENT TO A NO-REPLY DESTINATION EMAIL ADDRESS

(75) Inventor: Gary B. Paul, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 153 days.

(21) Appl. No.: 12/133,248

(22) Filed: Jun. 4, 2008

(65) Prior Publication Data

US 2008/0235344 A1 Sep. 25, 2008

Related U.S. Application Data

(63) Continuation of application No. 10/666,526, filed on Sep. 18, 2003, now Pat. No. 7,406,504.

(51) Int. Cl.
*G06F 15/16* (2006.01)

(52) U.S. Cl. ...................................... 709/206; 709/207
(58) Field of Classification Search ........... 709/206–207
See application file for complete search history.

(56) References Cited

U.S. PATENT DOCUMENTS

| | | | |
|---|---|---|---|
| 6,760,753 B1 * | 7/2004 | Ohgushi et al. | 709/206 |
| 6,769,067 B1 * | 7/2004 | Soong | 726/2 |
| 7,072,942 B1 * | 7/2006 | Maller | 709/206 |
| 7,406,504 B2 * | 7/2008 | Paul | 709/206 |
| 7,433,924 B2 * | 10/2008 | Malcolm | 709/206 |
| 2003/0220978 A1 * | 11/2003 | Rhodes | 709/206 |
| 2005/0080864 A1 * | 4/2005 | Daniell | 709/206 |
| 2008/0168149 A1 * | 7/2008 | Daniell | 709/206 |

* cited by examiner

*Primary Examiner* — Bharat Barot
(74) *Attorney, Agent, or Firm* — Toler Law Group

(57) ABSTRACT

Auto reply email and auto reply email methods are disclosed. A particular email message includes a no-reply origination address and a message body. Characteristics of the message body are selected based at least partially on a previous email message sent to the no-reply origination address.

20 Claims, 7 Drawing Sheets

| FIG. 6A | FIG. 6B |

TREATMENT OF EMAIL MESSAGES SENT TO A NO-REPLY DESTINATION EMAIL ADDRESS

CLAIM OF PRIORITY

The present application claims priority from and is a continuation of patent application Ser. No. 10/666,526 filed on Sep. 18, 2003 and entitled "Intelligent Email Detection and Auto Reply Email Technique to Emails Destined to No Reply Email Addresses," the contents of which are expressly incorporated herein by reference in their entirety.

FIELD OF THE DISCLOSURE

The present disclosure relates to electronic communications and, more particularly, to the processing of incoming email.

BACKGROUND

Electronic communication between businesses and their customers is becoming increasingly popular. Businesses often provide a website via the Internet that includes links to electronic applications and forms for communicating with customers. Additionally, businesses can send order confirmations, billing statements, account status, and marketing communications electronically via email to their customers for minimal cost.

Businesses often do not wish to receive replies to the emails sent to customers and thus insert a "no-reply" address as the origination address and prefer that customers utilize the website tools for communications. Most email receiving systems provide reply buttons that allow the easy generation of a reply message addressed to the origination address of the sent email. Customers often do reply to the sent message, even if requested otherwise. Additionally, some email receiving systems provide automatic out-of-office, mailbox full, or invalid address replies to the origination address of the sent email. Businesses face the dilemma of ignoring the reply emails and thus missing important customer communication or spending hours manually sorting through response emails to filter, sort and take action on the emails.

Accordingly, there is a need for an improved system and method of processing email and to address the above issues.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

An intelligent email detection and auto reply email tool is disclosed. Email sent to customers can be formatted in such a way to provide intelligent tracking and processing by a layered system of processes that receive and detect the types of email replies received. An email sent to a customer can have a no-reply origination address and control identifiers that then are recognized on incoming replies. The control identifiers can include such information as application information that identifies an application that generated the email sent to the customer (billing, marketing, order confirmation), region information, and an auto reply email count.

Incoming email replies to the no-reply address are filtered by a layer of dynamic filters that search the addresses, subject line, and body of each email to detect common patterns, such as invalid address responses, out-of-office replies, and unsubscribe requests. An auto reply email is generated for incoming emails that require a response and is sent to the origination address of the incoming email.

The auto reply email can be associated with a web-based customer feedback tool including, for example, a dynamic web page that directly intelligently interlinks the customer to a web-based customer feedback system. The auto reply email can include a web form that has customer information pre-populated including the customer's original comments. This allows the customer to simply fill in some missing information and hit a submit button which then sends the email to the web-based customer feedback tool on the business's web site. The email is then directed to the correct channel for routing and handling. The intelligent email detection and auto reply email tool can also provide the flexibility to efficiently handle replies to outgoing email corporate-wide.

With this method, manual interpretation and intervention of incoming email is reduced, while bridging the gap between traditional email interactions and web-based feedback channels. The intelligent email detection and auto reply email tool can provide the flexibility to efficiently handle replies to outgoing email corporate-wide.

Figure 1:
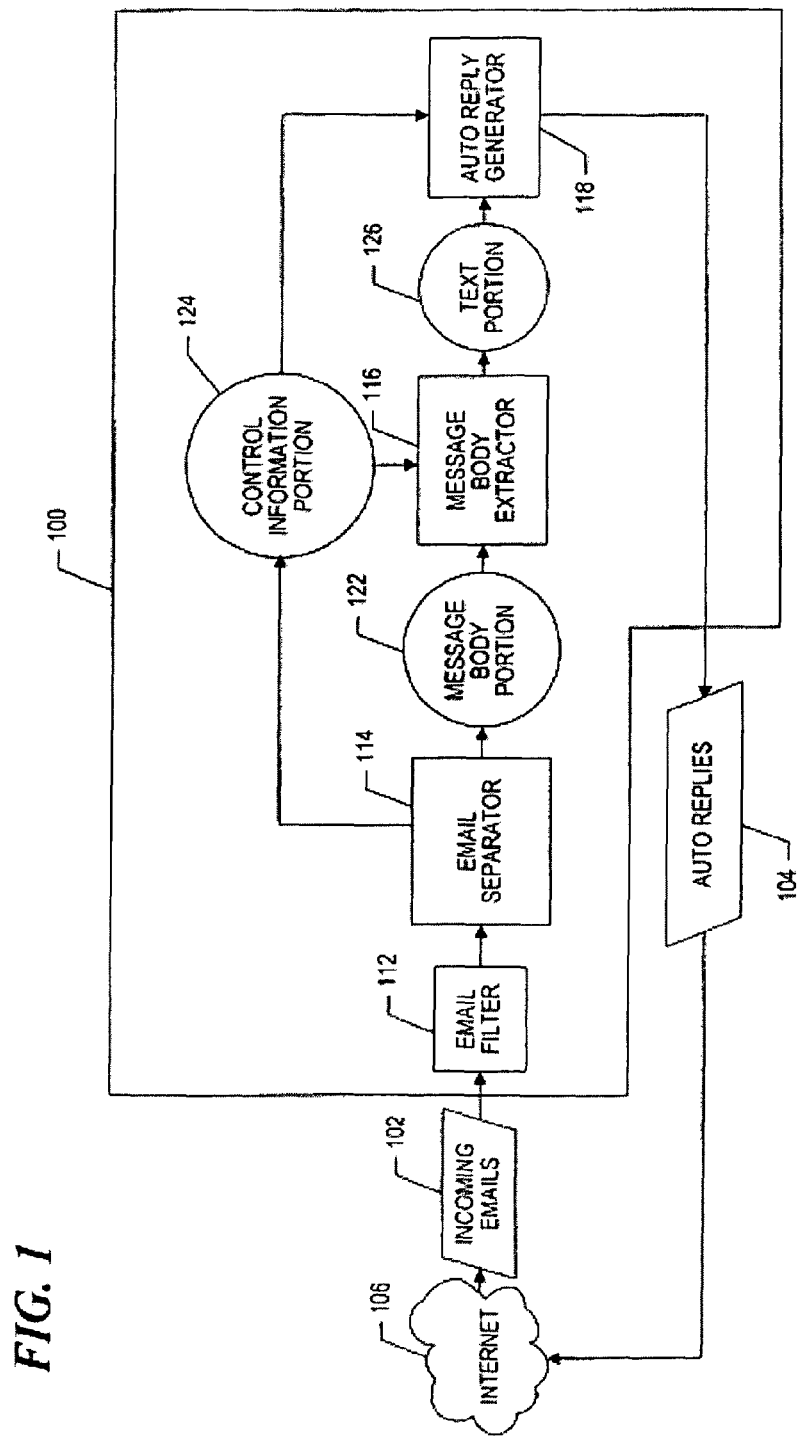
FIG. 1 illustrates a flow diagram of an intelligent email detection and auto reply email tool according to an embodiment of the present disclosure.

FIG. 1 illustrates a flow diagram of an intelligent email detection and auto reply email tool 100 according to an embodiment of the present disclosure. Tool 100 receives incoming emails 102 and sends auto reply emails 104 via Internet 106. Tool 100 includes an email filter 112, an email separator 114, a message body extractor 116 and an auto reply email generator 118. Filter 112 receives incoming emails 102. Incoming emails 102 are addressed to a specific destination address, for example, a no-reply address. Filter 112 determines the incoming emails 102 that require further action and forwards the selected emails to email separator 114. Separator 114 separates each email into multiple parts, including a control information portion 122 and a message body portion 124. Message body extractor utilizes message body portion 122 and control information portion 124 to extract a text portion 126 from the message body portion 122. Utilizing control information portion 124 and text portion 126, auto reply email generator 118 generates an auto reply email message.

The no-reply address includes control information that improves the generation of successful auto reply email messages. The no-reply address is constructed when an original email is sent to a customer. The no-reply address can have the format: applid.region.custtype(.arlcount)(.emailid)@noreply.company.com. The application identifier (applid) defines the application that sent the original message. For example, applications can include billing, order confirmation and other such tools. The region identifier (region) defines the customer's region or location such as northwest, California, or Europe. The customer type (custtype) defines the customer's product type such as residential or business. An optional auto reply email loop (ARL) count (arlcount) defines the number of times an auto reply email has been sent. An optional email identifier (emailid) can be included identifying a sender of the original email, which may be a unique number. The control information can be used for, among other things, defining a template for the auto reply email. If no control information is present or otherwise unrecognized, a generic auto reply email can be sent.

Figure 2:
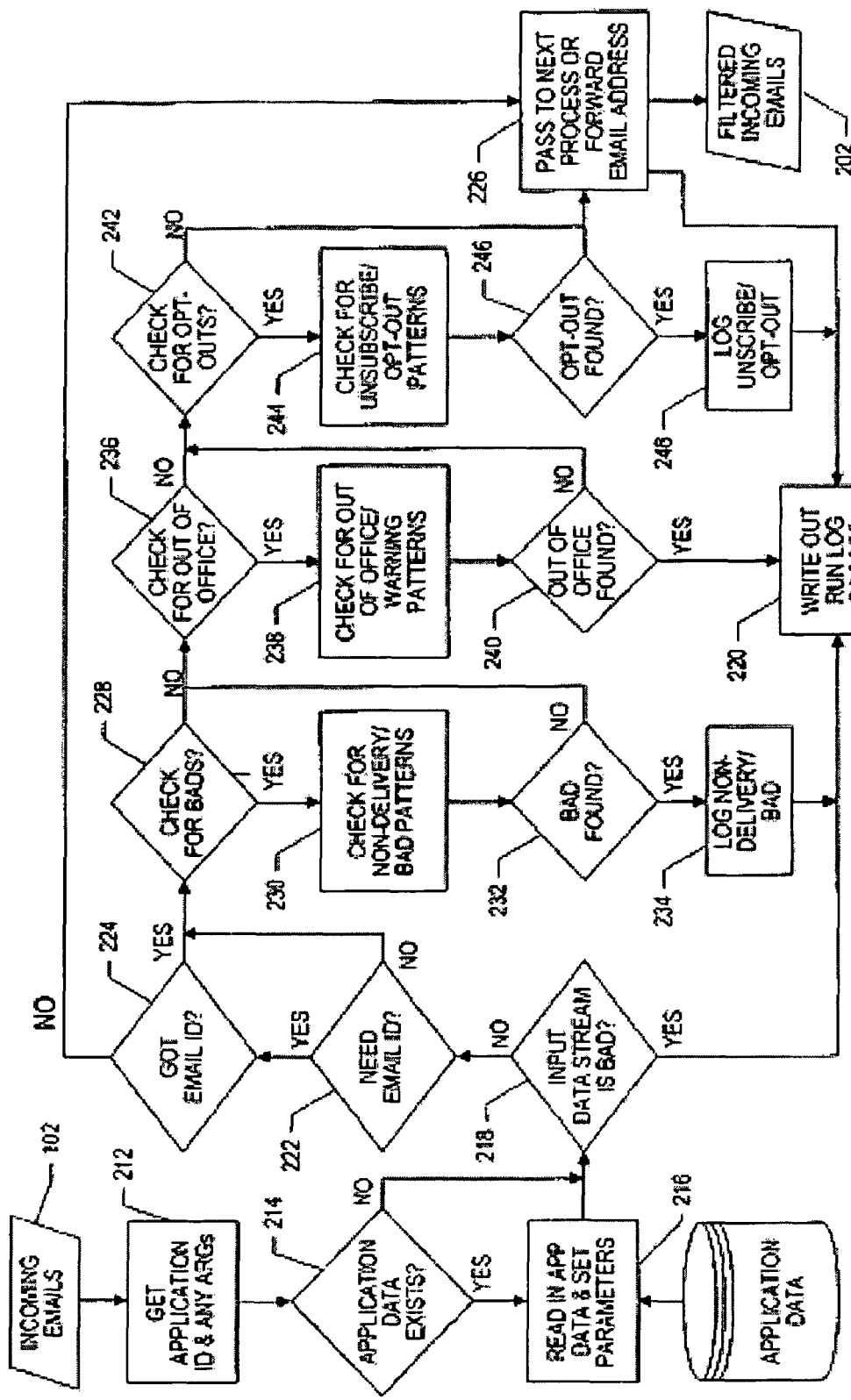
FIG. 2 is a flow diagram illustrating an operation of an email filter according to an embodiment of the present disclosure.

FIG. 2 is a flow diagram illustrating an operation of email filter 112 according to an embodiment of the present disclosure. Incoming emails 102 are examined to determine emails that require further action, resulting in filter incoming emails 202. Email filter 112 identifies the incoming email to determine if it is associated with a particular application. If so, email filter 112 sets parameters to check for specific patterns, for example, out-of-office replies, invalid address responses, and unsubscribe notifications. Emails not requiring an auto reply email are filtered and not sent to the next process.

First, an application identifier and any associated arguments are identified in an incoming email, step 212. A determination is made whether application data for the identified application exists, step 214. If so, application data is obtained and any parameters set, step 216. A determination is made whether the data stream in the incoming email is invalid, step 218. If so, the process is ended and a log created, step 220. If the data stream is valid, parameters are checked to determine if an email identifier is needed, step 222. If so, a determination is made whether the incoming email has an email identifier, step 224. If not, the incoming email is passed on to the next process, step 226. If an email identifier is not needed or an email identifier is found, parameters are checked to determine if the incoming email is to be checked for non-delivery notification or other bad patterns, step 228. If the incoming email is to be checked, the incoming email is compared to, for example, common non-delivery pattern data, step 230. A determination is made whether the invalid pattern is found, step 232. If the invalid pattern is found, a non-delivery log is created, step 234 and the process is ended and a log created, step 220. If the invalid pattern is not found or is not checked for, parameters are checked to determine if the incoming email is to be checked for out-of-office or warning patterns, step 236.

If the incoming email is to be checked, the incoming email is compared to, for example, common out-of-office or warning pattern data, step 238. A determination is made whether the out-of-office or warning pattern is found, step 240. If the out-of-office or warning pattern is found, the process is ended and a log created, step 220. If the out-of-office or warning pattern is not found or is not checked for, parameters are checked to determine if the incoming email is to be checked for opt-out or unsubscribe emails, step 242. If the incoming email is to be checked, the incoming email is compared to, for example, common opt-out or unsubscribe pattern data, step 244. A determination is made whether an opt-out email is found, step 246. If found, an opt-out log is created, step 248 and the process is ended and a log created, step 220. If an opt-out is not found or is not checked for, the incoming email is passed to the next process, step 226, as one of filtered emails 202.

Non-delivery logs and opt-out logs (not shown) can be used to eliminate those customer addresses from mailing lists.

Figure 3:
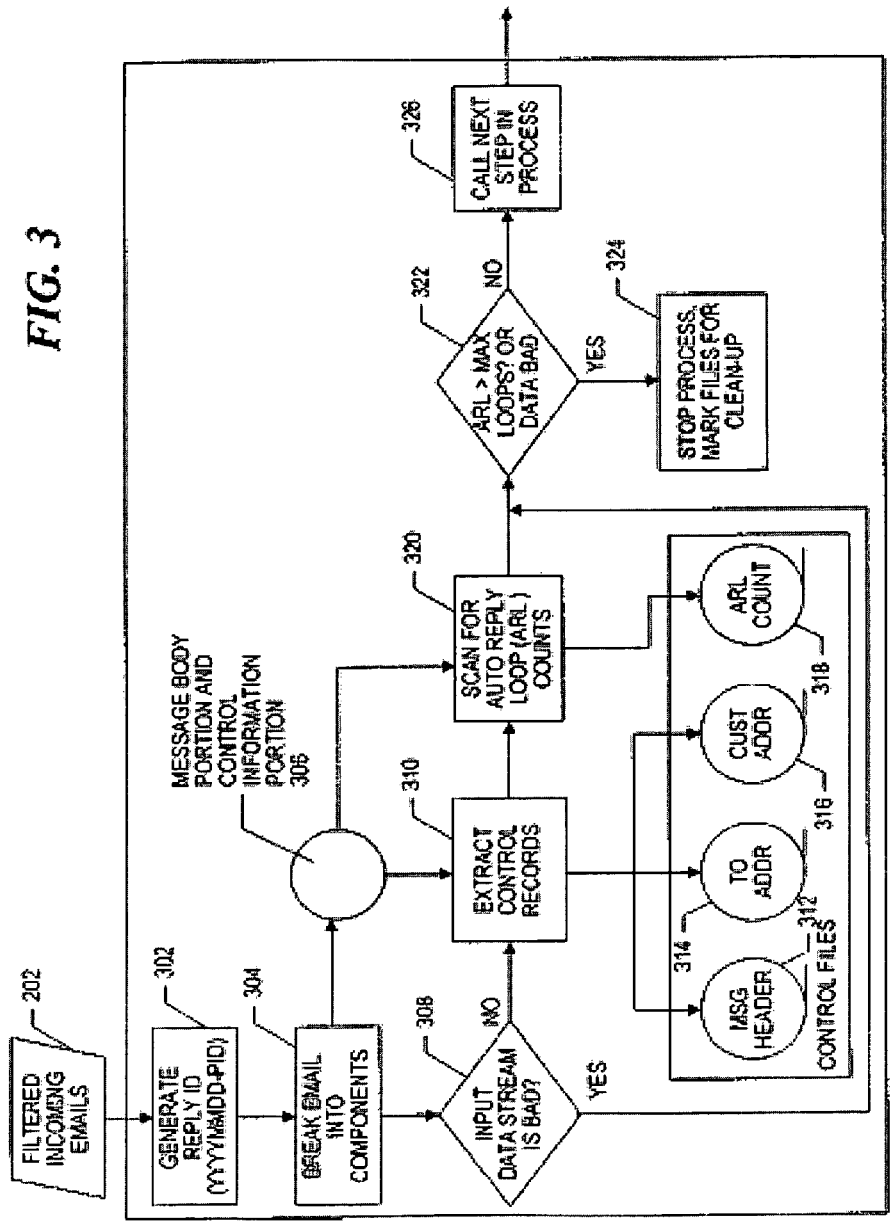
FIG. 3 is a flow diagram illustrating an operation of an email separator according to an embodiment of the present disclosure.

FIG. 3 is a flow diagram illustrating an operation of an email separator according to an embodiment of the present disclosure. Each filtered email is separated into multiple components, for example, control information portions and a message body portion.

Each of filtered incoming emails 202 are assigned a reply identification, step 302. For example, the reply identification can have the format YYYYMMDD-PID, including the year (YYYY), month (MM), day (DD) and a unique identifier (PID). The reply identifier tracks the multiple components throughout the auto reply email generation process to enable the successful generation of an auto reply email. Each of filtered incoming emails 202 are separated into multiple parts, step 304, including message body and control information portions 306. A determination is made if the input data stream is bad, step 308. If not, control records are extracted, step 310. Control records can include a message header 312, a destination address (to addr) 314, and an origination address (customer addr) 316. An auto reply email loop (ARL) count 318 is scanned for, step 320. ARL count 318 identifies the number of times the email has been through the process, for example, if a customer has repeatedly replied to the no-reply address and not accessed the web-based customer feedback tool as directed. A determination is made whether ARL count 318 is greater than a predetermined threshold value or the data stream is bad, step 322. For example, the predetermined threshold can be set at two or three. If ARL count 318 is greater than a predetermined threshold value, the process is ended and files are marked for clean up, step 324. If the ARL count 318 is not greater than the predetermined threshold value and the data stream is determined to be valid, the next process is called, step 326.

Figure 4:
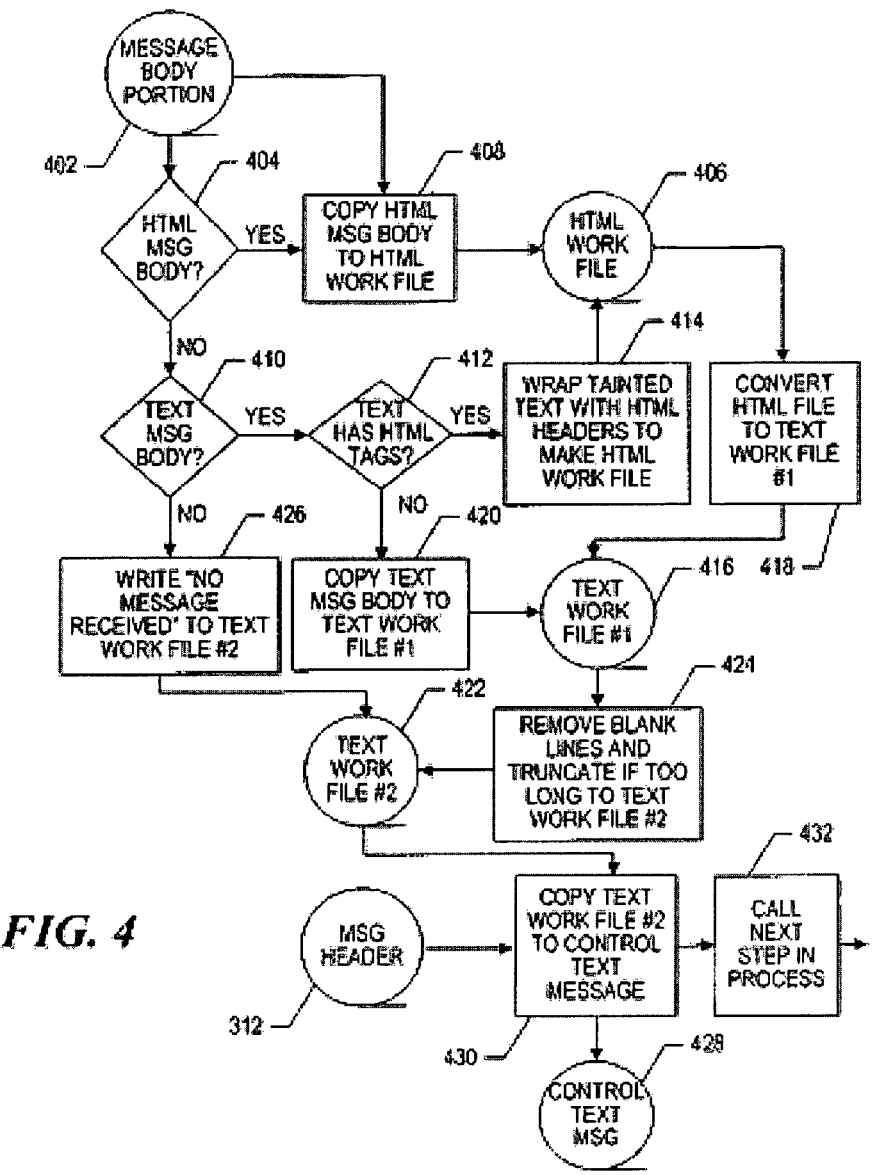
FIG. 4 is a flow diagram illustrating an operation of a message body extractor according to an embodiment of the present disclosure.

FIG. 4 is a flow diagram illustrating an operation of a message body extractor according to an embodiment of the present disclosure. Message body portion 402 is examined to determine if it contains an HTML message body, step 404. If so, the HTML message body is copied to an HTML work file 406, step 408. If the message body portion 402 does not contain an HTML message body, a determination is made whether it has a text message body, step 410. A determination is made whether the text message body contains HTML tags, step 412. If so, the tainted text message is wrapped with HTML headers and written to HTML work file 406, step 414. HTML work file 406 is converted to a first text work file 416, step 418. If the text message body does not have HTML tags, the text message body is copied to the first text work file 416, step 420. The first text work file 416 has any blank lines removed, is truncated if greater than a predetermined limit, and is written to a second text work file 422, step 424. The predetermined limit can be set according to a field in a template used for the auto reply email. If the message body portion 402 does not contain an HTML message body or a text message body, a "No message received" message is written to the second text work file 422, step 426. Message header 312 and the second text work file 422 are combined and copied to control text message 428, step 430. The next process is called, step 432.

Figure 5:
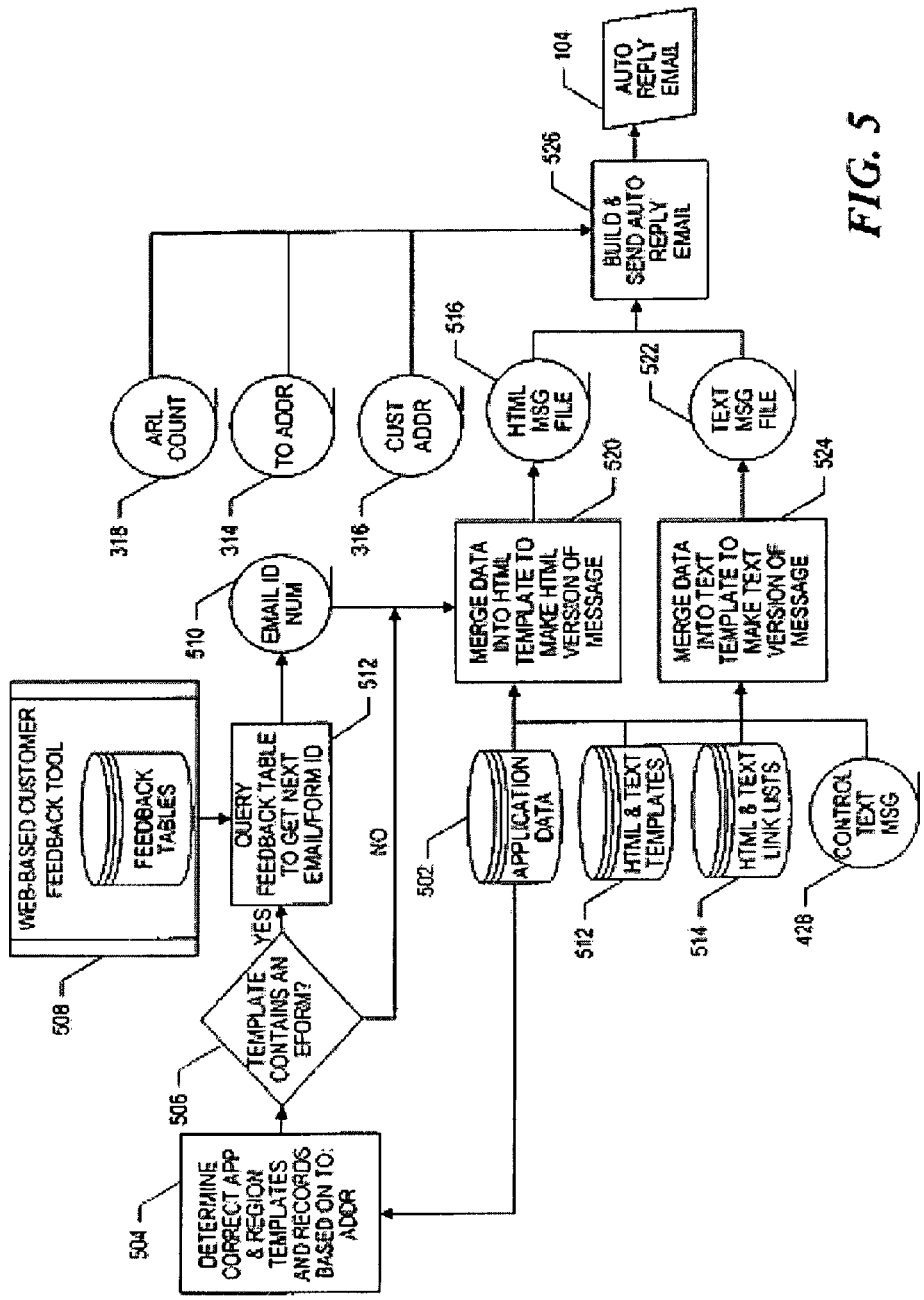
FIG. 5 is a flow diagram illustrating an operation of an auto reply email generator according to an embodiment of the present disclosure.

FIG. 5 is a flow diagram illustrating an operation of an auto reply email generator according to an embodiment of the present disclosure. A template is selected from an application database 502 utilizing information contained in destination address 314 of the incoming email, step 504. For example, destination address 314 can include an application identifier and a region identifier. These identifiers are used to select a template from multiple templates customized for different applications and regions. A determination is made whether the selected template contains an electronic form, step 506. If so, a feedback table of a web-based customer feedback tool 508 is queried to get a next email form identifier 510, step 512. Next email form identifier 510 is used to uniquely identify each customer feedback response. Typically customer responses are received via a customer accessing web-based customer feedback tool 508 via the Internet and next email form identifier 510 is assigned when the customer enables a submit response button on a web page. According to a particular embodiment of the present disclosure, the web page is included in the auto reply email message sent to a customer and includes next email form identifier 510. Next, data from application database 502, HTML and text templates database 512, HTML and text linked lists database 514 and control text message 428 are merged with next email form identifier 510 creating an HTML message file 516, step 520. Next, data from application database 502, HTML and text templates database 512, HTML and text linked lists database 514 and control text message 428 are merged creating a text message file 522, step 524. Auto reply email 104 is generated from HTML message file 516 and text message file 522 and sent, step 526.

Throughout all of the above processes, logs are written and kept tracking the auto reply email generation process. Logs can be useful for performance purposes, cleaning up bad address lists, and for overall improving customer relations.

Figures 6, 6A:
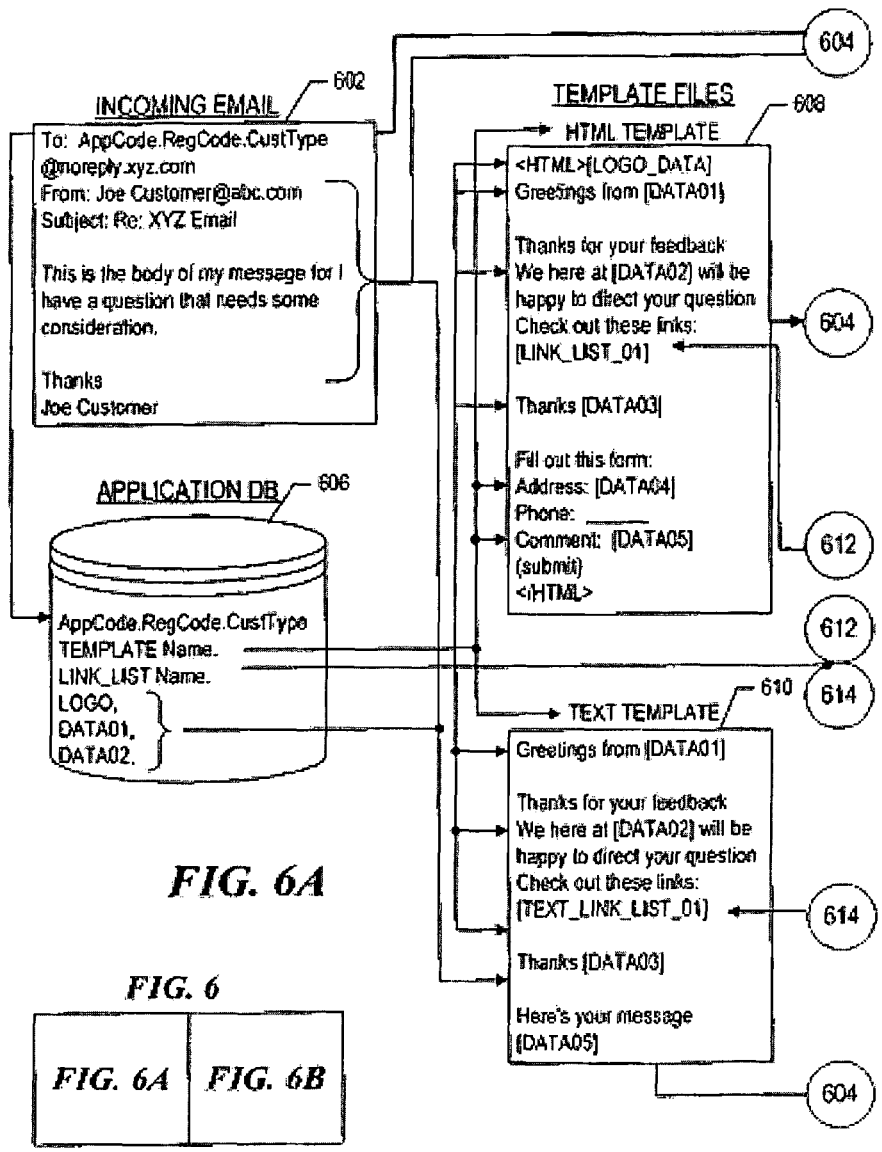
FIGS. 6A and 6B illustrate a data flow diagram of an intelligent email detection and auto reply email tool according to an embodiment of the present disclosure.
Figure 6B:
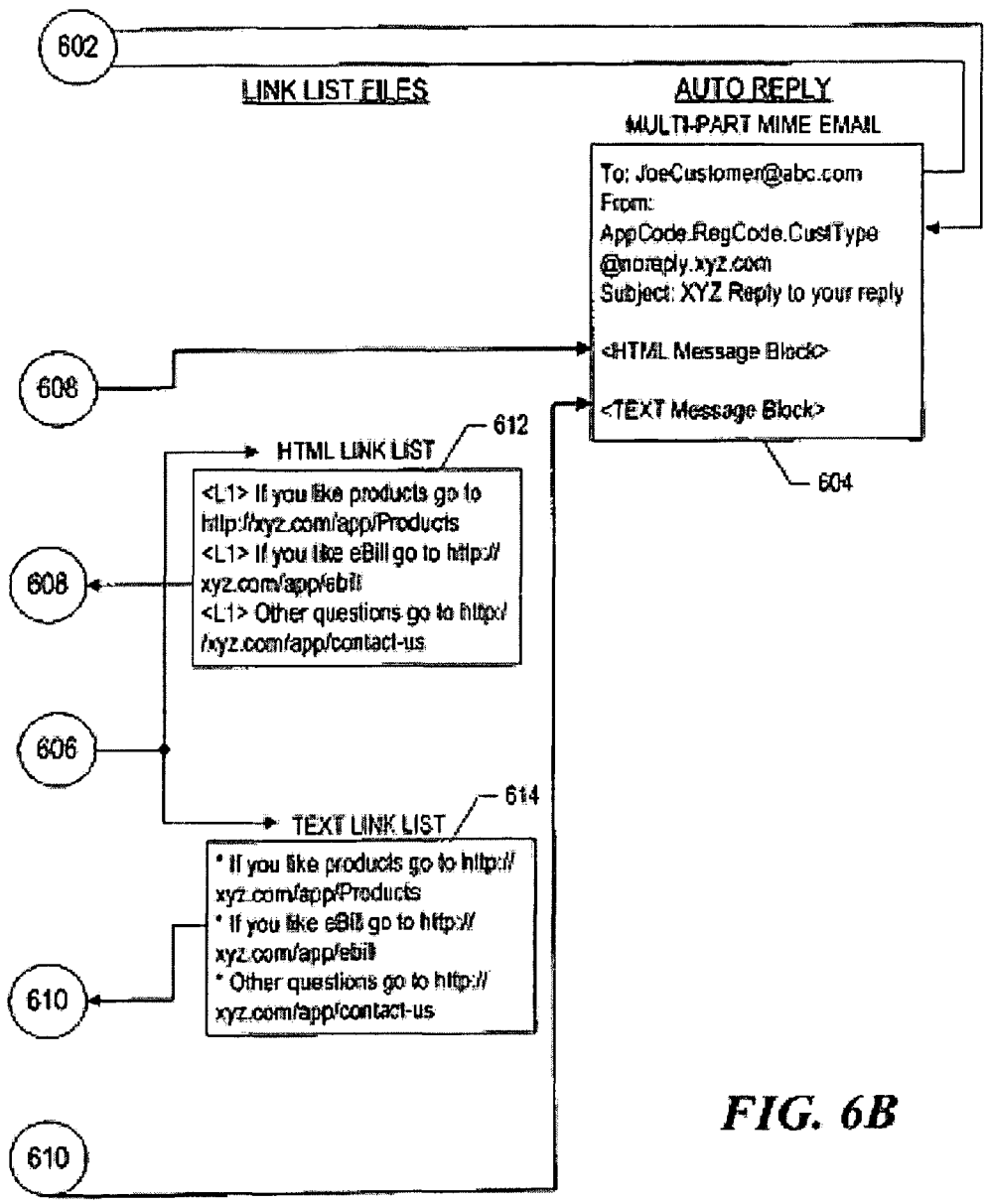

FIGS. 6A and 6B illustrate a data flow diagram of an intelligent email detection and auto reply email tool according to an embodiment of the present disclosure. Each incoming email 602 includes a destination address, for example, (AppCode.RegCode.CustType@noreply.xyz.com). The destination address is typically a no-reply address that was an origination address of an email sent to a customer. Incoming email 602 also includes an origination address, for example, (JoeCustomer@abc.com). Additionally, incoming email can include a subject line and a message body that can be in HTML format or text format. As illustrated, the origination address and the destination address of incoming email 602 substantially become the destination address and the origination address, respectively, of auto reply email 604. Note that an ARL count may have been incremented and other fields modified or added. Additionally, the destination address is used to select various processing characteristics in application database 606. For example, an HTML template 608 and a text template 610 are chosen. Additionally, HTML link list 612 and text link list 614 to be included in the templates can be identified. Other information, such as a logo and various data to be included in the templates can also be identified. The message body of incoming email 602, after processing, is included in HTML template 608 and text template 610. The populated HTML template 608 and the populated text template 610 are merged together to form auto reply email 604.

Templates are identified using application, region and customer type identifiers. Each template can have multiple associated files, for example, an HTML file with a web electronic form (eform), an HTML version without a web eform, and a text only version without a web eform. Link files are also identified and include for example, an HTML fragment file version using HTML tags and a text fragment file version with hyperlinks spelled out.

The processes described above are utilized for the generation of an auto reply email according to embodiments of the disclosure. It is appreciated that operations discussed herein can include steps executed by software modules. The functionality of steps referred to herein may correspond to the functionality of modules or portions of modules. The software modules can include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into sub-modules to be executed as multiple computer processes. Moreover, alternative embodiments may combine multiple instances of a particular module or sub-module. Operations may be combined or the functionality of the operations may be distributed in additional operations in accordance with the present disclosure.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
  receiving an incoming email message sent to an entity from an origination address at a computer that receives email messages sent to a particular destination address, wherein the particular destination address is a no-reply email address that includes characters to dissuade users from sending email to the particular destination address;
  determining, at the computer, whether the incoming email message has a particular pattern that indicates that the incoming email message is an automated response generated without user input to a first email message, wherein the first email message is sent from the entity to the origination address; and
  when the incoming email message does not have the particular pattern, sending from the computer an outgoing email message to the origination address, wherein the outgoing email message includes an address of a web page usable by a recipient of the outgoing email message to provide feedback to the entity.

2. The method of claim 1, wherein the entity is a business.

3. The method of claim 2, wherein determining whether the incoming email message has the particular pattern comprises examining control information in the no-reply email address to determine an application that generated the previous outgoing email message.

4. The method of claim 2, wherein determining whether the incoming email message has the particular pattern comprises examining control information in the no-reply email address to determine whether a reply count of the control information meets a threshold value.

5. The method of claim 1, wherein the incoming email message has the particular pattern when the incoming email message is an out-of-office reply.

6. The method of claim 1, wherein the incoming email message has the particular pattern when the incoming email message is an unsubscribe request.

7. The method of claim 1, wherein the incoming email message has the particular pattern when the incoming email message is an invalid address reply.

8. The method of claim 1, further comprising selecting a template for the outgoing email message based at least partially on an incoming message body of the incoming email message and control information in the particular destination address.

9. The method of claim 8, further comprising generating the outgoing email message based at least partially on the selected template and the incoming message body.

10. A computer-readable non-transitory storage medium, comprising:
    computer-executable instructions, that when executed, cause a computer to determine whether an incoming email message sent to a particular destination address associated with an entity has a particular pattern based at least partially on an incoming message body of the incoming email message and on control information in the particular destination address, wherein the particular destination address includes characters to dissuade users from sending email to the particular destination address, and wherein the particular pattern indicates that the incoming message is an automated response generated without user input to a first email message, wherein the first email message is from the entity to an origination address; and
    computer-executable instructions, that when executed, cause the computer to send an outgoing email message to the origination address when the incoming email message does not have the particular pattern, wherein the outgoing email message includes an address of a web page usable by a recipient of the outgoing email message to provide feedback to the entity.

11. The computer-readable non-transitory storage medium of claim 10, wherein "noreply" is formed by at least a portion of the characters that indicate that the particular destination address is a no-reply destination address.

12. The computer-readable non-transitory storage medium of claim 10, wherein the control information includes a counter of a number of times an auto reply message has been sent, and further comprising computer-executable instructions, that when executed, cause the computer to not send the outgoing email message when the counter is greater than a threshold value.

13. The computer-readable non-transitory storage medium of claim 10, further comprising computer-executable instructions, that when executed, cause the computer to create a log that includes an origination address of the incoming email message when the incoming email message has the particular pattern and the particular pattern is at least one of a non-delivery notification and an unsubscribe notification, and wherein the log is usable to remove one or more origination addresses from a mailing list.

14. The computer-readable non-transitory storage medium of claim 10, wherein the particular pattern comprises a mailbox full notification.

15. A method, comprising:
    receiving an incoming email message from an origination address at a computer that receives email messages sent to a particular destination address, wherein the particular destination address is a no-reply email address that includes characters to dissuade users from sending email to the particular destination address;
    determining, at the computer, whether the incoming email message has a particular pattern that indicates that the incoming email message is an automated response generated without user input to a first email message, wherein the first email address is sent from the entity to the origination address;
    creating a log that includes the origination address of the incoming email message when the particular pattern indicates that the incoming email message is at least one of a non-delivery notification and an unsubscribe notification, wherein the log is usable to remove one or more origination addresses from a mailing list; and
    disposing of the incoming email message without replying to the incoming email message, at the computer, when the email has the particular pattern.

16. The method of claim 15, wherein "noreply" is formed by at least a portion of the characters that indicate that the particular destination address is a no-reply destination address.

17. The method of claim 15, wherein the particular pattern comprises a non-delivery notification.

18. The method of claim 17, further comprising creating, at the computer, a non-delivery log including the origination address, wherein the non-delivery log is usable to remove one or more origination addresses from a mailing list.

19. The method of claim 16, wherein the particular pattern comprises an unsubscribe notification.

20. The method of claim 19, further comprising creating, at the computer, an opt-out log including the origination address, wherein the opt-out log is usable to remove one or more origination addresses from a mailing list.

* * * * *